(12) United States Patent  (10) Patent No.: US 9,143,467 B2
Kagan et al.  (45) Date of Patent: Sep. 22, 2015

(54) NETWORK INTERFACE CONTROLLER WITH CIRCULAR RECEIVE BUFFER

(75) Inventors: Michael Kagan, Zichron Yaakov (IL); Diego Crupnicoff, Buenos Aires (AR)

(73) Assignee: MELLANOX TECHNOLOGIES LTD., Yokneam (IL)

( * ) Notice: Subject to any disclaimer, the term of this patent is extended or adjusted under 35 U.S.C. 154(b) by 1002 days.

(21) Appl. No.: 13/280,457

(22) Filed: Oct. 25, 2011

(65) Prior Publication Data

US 2013/0103777 A1 Apr. 25, 2013

(51) Int. Cl.
| G06F 15/16 | (2006.01) |
| H04L 12/879 | (2013.01) |
| H04L 12/931 | (2013.01) |
| H04L 12/861 | (2013.01) |

(52) U.S. Cl.
CPC ............ *H04L 49/901* (2013.01); *H04L 49/358* (2013.01); *H04L 49/9031* (2013.01); *H04L 49/9068* (2013.01)

(58) Field of Classification Search
CPC ................... H04L 29/08549; H04L 29/08072; H04L 29/06; H04L 49/90; H04L 49/358; H04L 49/9068; H04L 49/9031; H04L 67/1097; G06F 3/002; G06F 3/0601; G06F 3/067; G06F 13/28
See application file for complete search history.

(56) References Cited

U.S. PATENT DOCUMENTS

| 6,097,734 | A  * | 8/2000 | Gotesman et al. ............. 370/474 |
| 6,321,276 | B1 | 11/2001 | Forin |
| 6,766,467 | B1 | 7/2004 | Neal et al. |
| 6,789,143 | B2 | 9/2004 | Craddock et al. |
| 6,981,027 | B1 | 12/2005 | Gallo et al. |
| 7,171,484 | B1 | 1/2007 | Krause et al. |
| 7,263,103 | B2 | 8/2007 | Kagan et al. |
| 7,299,266 | B2 | 11/2007 | Boyd et al. |
| 7,464,198 | B2 | 12/2008 | Martinez et al. |
| 8,051,212 | B2 | 11/2011 | Kagan et al. |
| 8,176,252 | B1 | 5/2012 | Alexander et al. |
| 8,495,301 | B1 | 7/2013 | Alexander et al. |
| 2002/0152327 | A1 | 10/2002 | Kagan et al. |
| 2003/0046530 | A1 | 3/2003 | Poznanovic |
| 2004/0221128 | A1 | 11/2004 | Beecroft et al. |
| 2004/0230979 | A1 | 11/2004 | Beecroft et al. |
| 2005/0135395 | A1 * | 6/2005 | Fan et al. ....................... 370/412 |
| 2007/0124378 | A1 * | 5/2007 | Elzur ............................. 709/204 |

(Continued)

OTHER PUBLICATIONS

Infiniband Trade Association, "InfiniBandTM Architecture Specification", vol. 1, Release 1.2.1, Nov. 2007.

(Continued)

*Primary Examiner* — Dhairya A Patel
(74) *Attorney, Agent, or Firm* — D. Kligler I.P. Services Ltd.

(57) ABSTRACT

A method for communication includes allocating in a memory of a host device a contiguous, cyclical set of buffers for use by a transport service instance on a network interface controller (NIC). First and second indices point respectively to a first buffer in the set to which the NIC is to write and a second buffer in the set from which a client process running on the host device is to read. Upon receiving at the NIC a message directed to the transport service instance and containing data to be pushed to the memory, the data are written to the first buffer that is pointed to by the first index, and the first index is advanced cyclically through the set. The second index is advanced cyclically through the set when the data in the second buffer have been read by the client process.

20 Claims, 3 Drawing Sheets

(56) References Cited

U.S. PATENT DOCUMENTS

2007/0162619 A1\*   7/2007   Aloni et al. .................... 709/250
2010/0262973 A1   10/2010   Ernst et al.
2010/0274876 A1   10/2010   Kagan et al.

OTHER PUBLICATIONS

"MPI: A Message-Passing Interface Standard", Version 2.2, Message Passing Interface Forum, Sep. 4, 2009.

Shah et al., "Direct Data Placement over Reliable Transports", IETF Network Working Group, RFC 5041, Oct. 2007.

Culley et al., "Marker PDU Aligned Framing for TCP Specification", IETF Network Working Group, RFC 5044, Oct. 2007.

U.S. Appl. No. 13/337,178, filed Dec. 26, 2011.

U.S. Appl. No. 13/471,558, filed May 15, 2012.

U.S. Appl. No. 13/229,772, filed Sep. 12, 2011.

"Linux kernel enable the IOMMU—input/output memory management unit support", Oct. 15, 2007 http://www.cyberciti.biz/tips/howto-turn-on-linux-software-iommu-support.html.

U.S. Appl. No. 12/430,912 Official Action dated Jun. 15, 2011.

U.S. Appl. No. 12/430,912 Official Action dated Nov. 2, 2011.

\* cited by examiner

NETWORK INTERFACE CONTROLLER WITH CIRCULAR RECEIVE BUFFER

FIELD OF THE INVENTION

The present invention relates generally to digital network communications, and specifically to devices for interfacing between a computing device and a packet data network.

BACKGROUND

InfiniBand™ (IB) is a switched-fabric communications architecture that is widely used in high-performance computing. It has been standardized by the InfiniBand Trade Association. Computing devices (host processors and peripherals) connect to the IB fabric via a network interface controller (NIC), which is referred to in IB parlance as a channel adapter. Host processors (or hosts) use a host channel adapter (HCA), while peripheral devices use a target channel adapter (TCA).

Client processes (referred to hereinafter as clients) running on a host processor, such as software application processes, communicate with the transport layer of the IB fabric by manipulating a transport service instance, known as a "queue pair" (QP), made up of a send work queue and a receive work queue. To send and receive messages over the network using a HCA, the client initiates work requests (WRs), which cause work items, called work queue elements (WQEs), to be placed onto the appropriate work queues. Normally, each WR has a data buffer associated with it, to be used for holding the data that is to be sent or received in executing the WQE. The HCA executes the WQEs and thus communicates with the corresponding QP of the channel adapter at the other end of the link.

IB channel adapters implement various service types and transport operations, including remote direct memory access (RDMA) read and write and send operations. Both RDMA write and send requests carry data sent by a channel adapter (known as the requester) and cause another channel adapter (the responder) to write the data to a memory address at its own end of the link. Whereas RDMA write requests specify the address in the remote responder's memory to which the data are to be written, send requests rely on the responder to determine the memory location at the request destination. This sort of send operation is sometimes referred to as a "push" operation, since the initiator of the data transfer pushes data to the remote QP.

Upon receiving a send request addressed to a certain QP, the channel adapter at the destination node places the data sent by the requester into the next available receive buffer for that QP. To specify the receive buffers to be used for such incoming send requests, a client on the host computing device generates receive WQEs and places them in the receive queues of the appropriate QPs. Each time a valid send request is received, the destination channel adapter takes the next WQE from the receive queue of the destination QP and places the received data in the memory location specified in that WQE. Thus, every valid incoming send request engenders a receive queue operation by the responder.

The Internet Wide Area RDMA Protocol (iWARP) offers services and semantics for Internet Protocol (IP) networks that are similar to the IB features described above. Features of iWARP are specified by Shah et al., in "Direct Data Placement over Reliable Transports," published as Request for Comments (RFC) 5041 of the Internet Engineering Task Force (IETF). Implementation of iWARP over the Transmission Control Protocol (TCP) is described by Culley et al., in "Marker PDU Aligned Framing for TCP Specification," published as IETF RFC 5044.

U.S. Pat. No. 7,263,103, whose disclosure is incorporated herein by reference, describes a method for network communication in which a pool of descriptors (or WQEs) is shared among a plurality of transport service instances used in communicating over a network. Each of the descriptors in the pool includes a scatter list, indicating a buffer that is available in a local memory. When a message containing data to be pushed to the local memory is received over the network on one of the transport service instances, one of the descriptors is read from the pool. The data contained in the message are written to the buffer indicated by the scatter list included in this descriptor.

U.S. Pat. No. 6,789,143 describes a distributed computing system in which queue pairs and completion queues are implemented in hardware. A mechanism is provided for controlling the transfer of work requests from the consumer to the channel adapter hardware and work completions from the channel adapter hardware to the consumer using head and tail pointers that reference circular buffers.

SUMMARY

Embodiments of the present invention that are described hereinbelow provide efficient methods for handling data "push" operations and apparatus that implements such methods.

There is therefore provided, in accordance with an embodiment of the present invention, a method for communication, which includes allocating in a memory of a host device a contiguous, cyclical set of buffers for use by a transport service instance on a network interface controller (NIC) that couples the host device to a network. First and second indices are provided to point respectively to a first buffer in the set to which the NIC is to write and a second buffer in the set from which a client process running on the host device is to read. The NIC receives from the network a message directed to the transport service instance and containing data to be pushed to the memory. Responsively to receiving the message, the data are written to the first buffer that is pointed to by the first index and advancing the first index cyclically through the set. The second index is advanced cyclically through the set when the data in the second buffer have been read by the client process.

In some embodiments, the buffers are all of a uniform size, for example one byte. The data from a single message may be to a succession of the buffers responsively to a quantity of the data in the message, whereupon advancing the first index includes advancing the first index by multiple increments, corresponding to the succession of the buffers.

In a disclosed embodiment, receiving the message includes processing the message in the NIC without consuming a work queue element (WQE) from a receive queue of the transport service instance. The host device typically does not post WQEs or allocate memory space for WQEs for the transport service instance.

Advancing the first index may include comparing the first and second indices, and refraining from accepting further data directed to the transport service instance when the first and second indices coincide.

In one embodiment, allocating the cyclical set of buffers includes sharing the buffers in the set among a group of multiple transport service instances, such that different transport service instances in the group use different ones of the buffers in succession. Advancing the second index may include verifying that the buffers prior to the second buffer have been read and released by the different transport service instances before advancing the second index. The method may further include, upon finding that one of the buffers has not been released over a predefined timeout period, identifying a stalled transport service instance to which the one of the buffers is assigned, and releasing the stalled transport service instance.

Allocating the set of the buffers may include allocating a contiguous range of virtual memory addresses or a contiguous range of physical memory addresses.

There is also provided, in accordance with an embodiment of the present invention, a network interface controller (NIC), including a network interface, which is configured to be coupled to a network. A host interface is configured to be coupled to a host device having a memory, in which a contiguous, cyclical set of buffers is allocated for use by a transport service instance on the NIC. Processing circuitry is coupled between the network interface and the host interface and is configured to handle first and second indices, which point respectively to a first buffer in the set to which the NIC is to write and a second buffer in the set from which a client process running on the host device is to read. Responsively to receiving a message from the network that is directed to the transport service instance and contains data to be pushed to the memory, the processing circuitry writes the data to the first buffer that is pointed to by the first index and advances the first index cyclically through the set. The second index is advanced cyclically through the set when the data in the second buffer have been read by the client process.

The present invention will be more fully understood from the following detailed description of the embodiments thereof, taken together with the drawings in which:

DETAILED DESCRIPTION OF EMBODIMENTS

Figure 1:
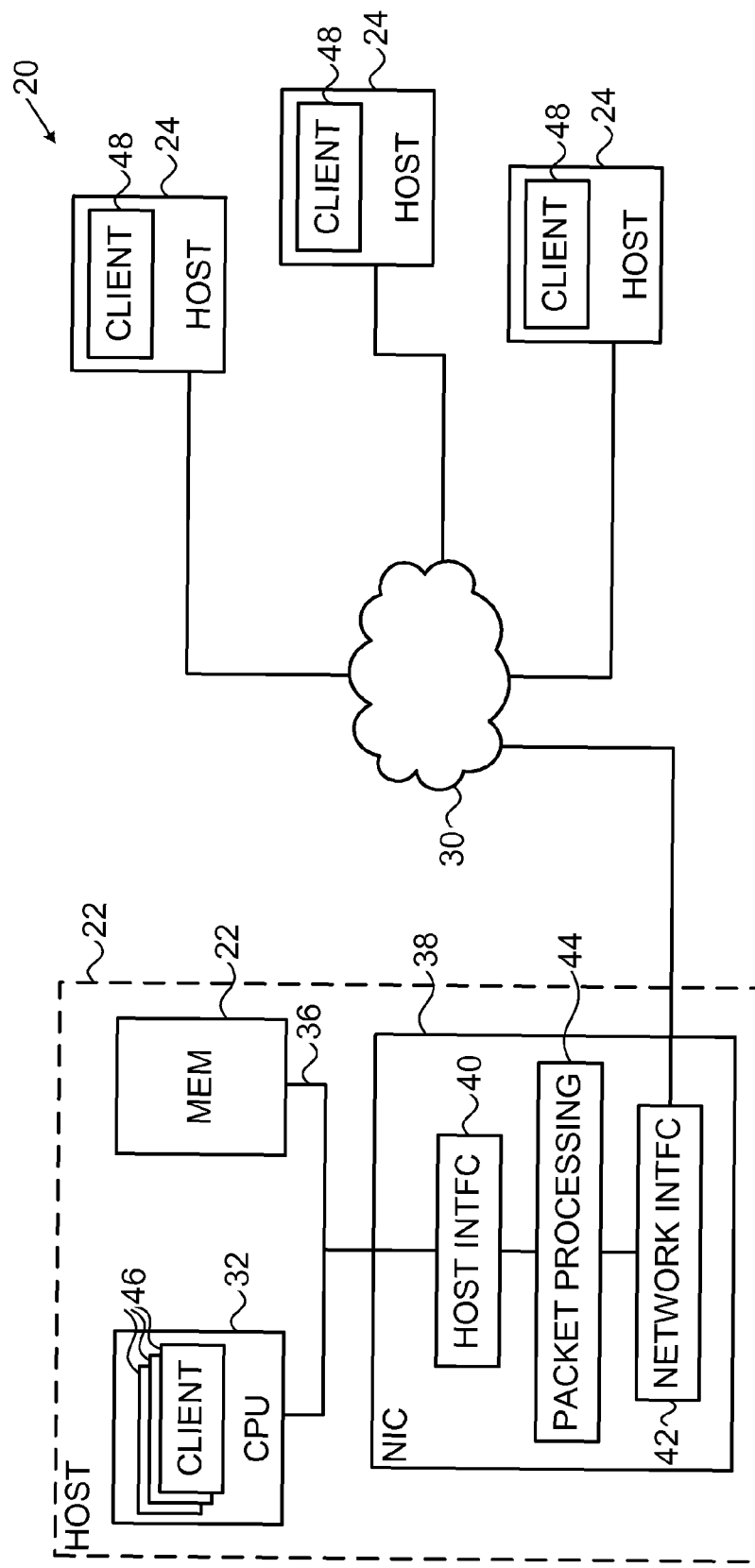
FIG. 1 is a block diagram that schematically illustrates a network communication system, in accordance with an embodiment of the present invention.

Pushing data to a remote node in a packet network—using send operations, for example—is a useful model for many data transfer operations, but it incurs substantial overhead: In conventional implementations, the client process on the receiving host device must continually post WQEs to the appropriate receive queue (or queues), and the NIC must fetch one of these WQEs and use the buffer information that it contains for each incoming send packet that it handles. The WQEs in the receive queue can consume considerable memory, and the production and consumption of these WQEs can add latency in processing of the pushed data, as well as consuming resources of the host CPU.

Embodiments of the present invention that are described hereinbelow address these shortcomings, and effectively obviate the need for WQEs in receiving pushed data from a network via a suitably-configured NIC. In these embodiments, client processes can configure their transport service instances on the NIC (such as QPs in the IB model) to operate either in the conventional, WQE-based mode or in this novel WQE-free mode, depending on application requirements. In the latter case, the client process allocates a contiguous, cyclical set of buffers in the host memory for use by the transport service instance in receiving packets containing data to be pushed to the memory (send packets in the IB model). The NIC writes to these buffers cyclically, as it receives packets from the network, and therefore has no need to fetch and read WQEs (and the host device and client process thus have no need to post WQEs or to allocate memory space for WQEs for the transport service instance in question). The client process likewise reads the buffers cyclically, and then releases them to allow the NIC to write new data as further packets arrive from the network. The receive queue in this sort of arrangement is referred to herein as a circular receive queue.

The buffers used in the WQE-free mode are "contiguous" in the sense that they follow one another sequentially over a contiguous range of memory addresses. This address range is typically defined in virtual memory space (and the virtual addresses are translated to physical addresses using the address translation functions of the NIC, as is known in the art). Alternatively or additionally, the contiguous address range may be defined in terms of physical memory addresses. (In conventional implementations, WQEs posted by a software application are generally allowed to specify only virtual addresses due to memory protection concerns; and these virtual addresses are translated into physical addresses by the NIC in run time. In the WQE-free mode, however, physical addresses of the buffers are assigned in advance by a kernel-level operation performed by the trusted NIC device driver. The circular receive queue can then reference physical addresses safely, avoiding the need for address translation by the NIC in run time.) The buffers are "cyclical" in the sense that after the NIC has written to the last buffer in the range, it next goes on automatically to write to the first buffer in the range, as though the buffers were arranged in a ring; and read operations by the client process progress in similar sequence.

The buffers may be of any suitable size. Typically (although not necessarily), for simplicity of implementation, the buffers are all of a uniform size, also referred to as a "stride." In processing an incoming packet, the NIC may write the pushed data that it contains to a single buffer or to a succession of two or more buffers in sequence, depending on the quantity of the data in the message. In some applications, the buffer size is a single byte. This latter approach is particularly useful in media streaming applications, for example.

The NIC and client process keep track of the buffers using a pair of indices, which are referred to hereinbelow as a producer index (PI) and a consumer index (CI). The PI points to the last buffer in the set to which the NIC has written, while the CI points to the next buffer in the set from which the client process is to read. Upon receiving a message that contains data to be pushed to the host memory and is directed to a transport service instance that uses the WQE-free model, the NIC advances the PI in the appropriate cyclic order and writes the data to the buffer that is pointed to by the PI. The NIC may advance the PI in increments of one, or in multiple increments in implementations in which the NIC can write data from a single message to succession of multiple buffers. The CI is likewise advanced cyclically through the set of buffers as the data are read out by the client process. The NIC is thus able to process incoming messages containing pushed data and to write the data to memory without consuming WQEs from the receive queue of the transport service instance; and the client process is able to identify the buffers containing the pushed data without having to post WQEs to the receive queue.

In some embodiments, the buffers in the cyclical set are shared among a group of multiple transport service instances. Different transport service instances in the group use different buffers in succession, as they receive pushed data. Handling of the PI and CI is modified to deal with this sort of buffer sharing, as described in greater detail hereinbelow.

For the sake of clarity, the embodiments that are shown in the figures and are described below relate particularly to an IB HCA and use IB terminology. The principles of the present invention, however, are not limited to the IB context and may similarly be applied in other sorts of networks and devices that implement push operations. For example, the methods described hereinbelow may be applied, mutatis mutandis, in the context of iWARP over IP networks, as described above in the Background section, as well as in RDMA over Converged Ethernet (RoCE).

FIG. 1 is a block diagram that schematically illustrates a network communication system 20, in accordance with an embodiment of the present invention. A host computer 22 (also referred to as a host or a host device) communicates with other hosts 24, 26, 28 via a network 30, such as an IB switch fabric. Computer 22 comprises a central processing unit (CPU) 32 and a memory 34, which are connected by a suitable bus 36, as is known in the art. A NIC 38, such as an IB HCA, connects computer 22 to network 30.

NIC 38 comprises a network interface 42, which is coupled to network 30, and a host interface 40, which connects to CPU 32 and memory 34 via bus 36. Packet processing circuitry 44, coupled between network interface 42 and host interface 40, generates outgoing packets for transmission over network 30 and processes incoming packets received from the network, as described below. Interfaces 40 and 42 and circuitry 44 typically comprise dedicated hardware logic, whose details will be apparent to those skilled in the art after reading the present description. Alternatively or additionally, at least some of the functions of circuitry 44 may be implemented in software on a suitable programmable processor.

Client processes (referred to simply as clients 46) running on CPU 32, such as processes generated by application software, communicate with clients 48 running on remote hosts 24, 26, 28 by means of QPs on NIC 38. Each client 46 is typically assigned multiple QPs, which are used to communicate with different clients on various remote hosts. As noted earlier, some of these QPs may operate in the conventional manner, according to which client 46 posts WQEs to both the send queue and the receive queue of the WQE. Other QPs, however, have a circular receive queue, as defined above. In this latter arrangement, the client to which the QP belongs allocates a cyclical set of buffers for receiving pushed data that are conveyed by IB send requests, and thus avoids the need to post WQEs to the receive queue. NIC 38 is informed of this QP configuration, typically at the time of initialization of the QP, and handles incoming send requests accordingly.

Figure 2:
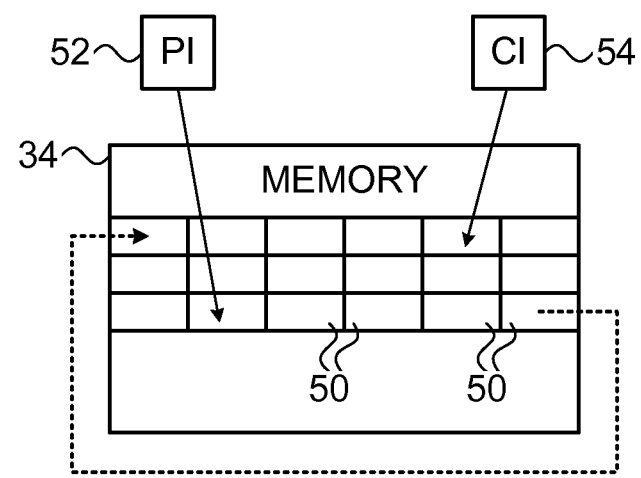
FIG. 2 is a block diagram that schematically shows allocation of data buffers in a memory, in accordance with an embodiment of the present invention.

FIG. 2 is a block diagram that schematically illustrates a cyclical set of buffers 50 that are allocated in memory 34 for a given QP, in accordance with an embodiment of the present invention. Buffers 50 may be of any suitable size or stride, down to a single byte. The buffers follow one another sequentially over a contiguous range of addresses in memory 34, as shown in the figure.

A producer index (PI) 52 points to the buffer 50 that is currently at the tail of the circular receive queue and thus indicates to processing circuitry 44 where to begin writing the next item of pushed data arriving in an incoming send request. Before writing the pushed data, circuitry 44 advances PI 52 to the next available buffer (by a single increment or by multiple increments, as noted above). Upon reaching the end of the assigned memory range, the PI cycles back to the buffer 50 that is located at the beginning of the range.

A consumer index (CI) 54 points to the buffer 50 that is currently at the head of the circular receive queue and indicates the next item of pushed data that client 46 is going to read from memory 34. After reading the data from a given buffer 50, client 46 advances CI 54 to indicate to NIC 38 that the buffer can be released, and circuitry 44 can overwrite the buffer with new data. Typically, the current values of PI 52 and CI 54 are held in designated fields in memory 34, and these values may be cached in NIC 38, as well.

Figure 3:
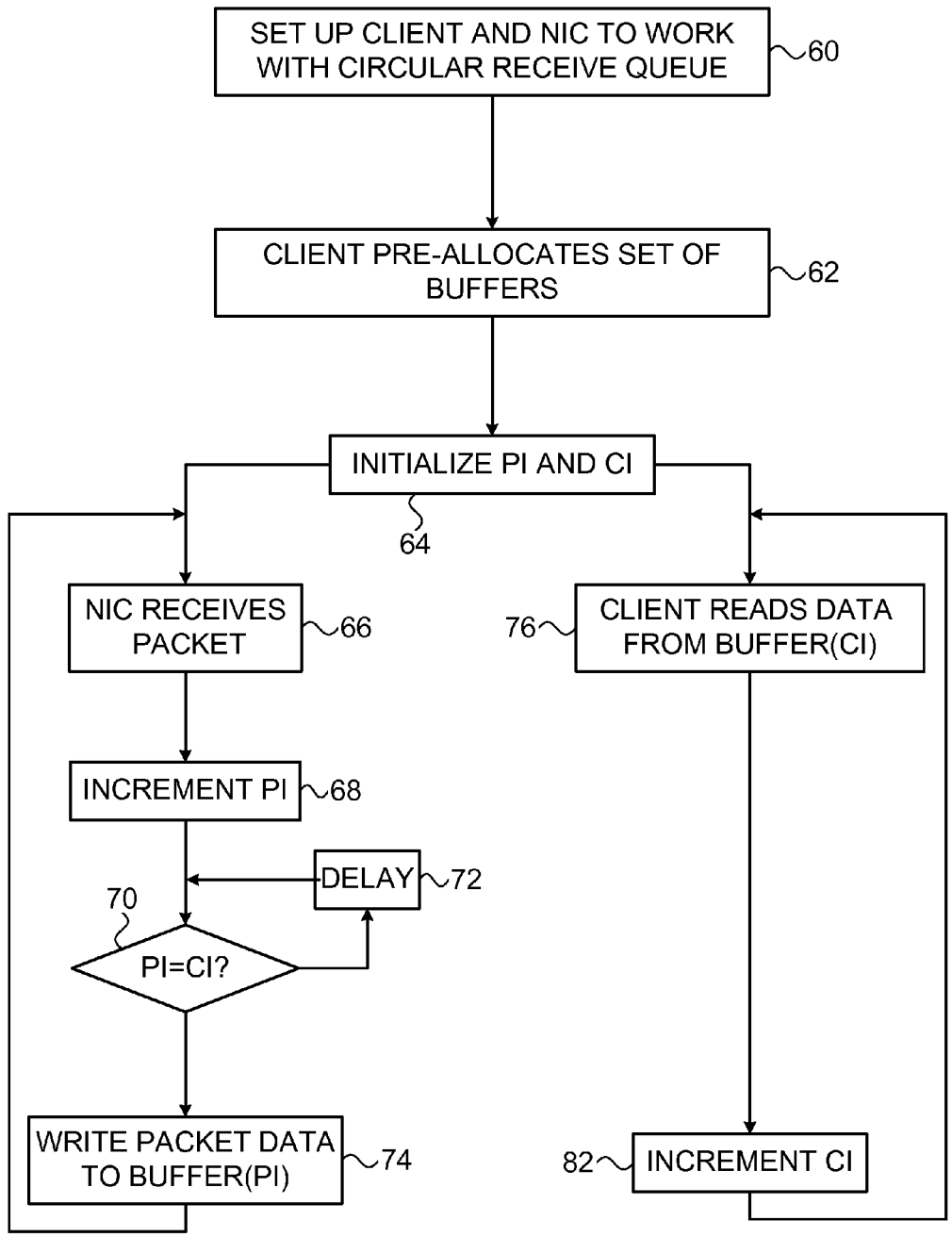
FIG. 3 is a flow chart that schematically illustrates a method for receiving data, in accordance with an embodiment of the present invention.

FIG. 3 is a flow chart that schematically illustrates a method for receiving data pushed from network 30 to host computer 22, in accordance with an embodiment of the present invention. During a setup step 60, typically before client processes 46, 48 start their normal operation, one or more QPs are configured to operate with circular receive queues. This QP configuration is performed both on the client side and on NIC 38, so that the corresponding client 46 will not attempt to post receive WQEs, and processing circuitry 44 will not attempt to read them.

For these WQE-free QPs, client 46 pre-allocates a contiguous range in memory 34, and the range is divided into a cyclical set of buffers 50, in a memory allocation step 62. The allocation may be performed in terms of either virtual or physical memory addresses, as noted above. At step 62, the client may also choose the buffer (or stride) size. Typically, the memory allocation performed in step 62 is a privileged, kernel-level operation, which is carried out through NIC device driver software that is associated with the host operating system (not shown in the figures). Following the set-up stage, however, client 46 and NIC 38 can manipulate buffers 50 without kernel-level involvement. If the buffers are specified in terms of virtual memory addresses, NIC 38 will perform the necessary translation to physical addresses using memory translation tables as is known in the art; but if the buffers have been specified in terms of physical memory addresses, no such translation is required. Processing circuitry 44 initializes PI 52 and CI 54, typically to locations at the beginning of the allocated memory range, at an index initialization step 64.

Optionally, the circular receive queue and the set of buffers that are set up in steps 60 and 62 may be shared among multiple QPs. For example, the respective QPs that are used by a given client 46 on host 22 in communicating with clients 48 on hosts 24, 26, 28, . . . , may all share the same circular receive queue and set of buffers. This approach can be useful in reducing the total number of buffers and the size of the memory range that are allocated to the application. Further aspects of shared receive queues are described in the above-mentioned U.S. Pat. No. 7,263,103, and may be applied in sharing of cyclical sets of buffers, mutatis mutandis.

Upon receiving an incoming send packet, at a packet input step 66, NIC 38 checks the context information for the destination QP number of the packet in order to determine how the packet data should be handled. The QP context information is typically stored in memory 34, but it may also be cached in NIC 38 for more efficient handling. When the context information indicates that the QP in question has a circular receive queue, processing circuitry 44 advances PI 52 to indicate the buffer 50 (or buffers) to which the data in the send packet are to be written, at a PI incrementation step 68.

If NIC 38 has received and written data to buffers 50 at a significantly faster rate than client 46 has been able to read and process the data, PI 52 will advance through the buffers in memory 34 faster than CI 54. A situation may then arise in which all of buffers 50 contain data waiting to be read and processed. In other words, PI 52 may get ahead of CI 54 by almost an entire cycle through buffers 50 and may thus overtake the CI. It is important, however, that circuitry 44 avoid overwriting data in buffers 50 that process 46 has not yet read.

Therefore, upon advancing PI 52, circuitry 44 checks whether PI 52 has reached the value of CI 54, at an index checking step 70.

If so, circuitry 44 refrains from writing further packet data to buffers 50 until CI 54 has advanced, at a write delay step 72. If necessary, circuitry 44 may drop the present packet and other, subsequent packets with the same destination QP (or group of QPs sharing the same circular receive queue). This sort of buffer overflow condition may be handled using signaling that is specified for such situations by the IB specification or other relevant standards. For example, NIC 38 may transmit a receiver not ready—negative acknowledgment (RNR NACK) packet to the corresponding QPs on hosts 24, 26, 28, . . . , in order to deter them from sending further packets to the destination QP until the buffer overflow has been resolved.

In usual operating conditions, however, PI 52 will not overtake CI 54, and NIC 38 will write the push data contained in the packet to the buffer 50 in memory 34 that is indicated by PI 52, at a data writing step 74. Upon writing data to a buffer, NIC 38 may post a completion queue element (CQE) to the appropriate completion queue, in order to inform client 46 that new data are available in the buffer for processing by the client. These CQE writing and handling operations may be carried out in a conventional manner.

Client 46 reads the data from buffers 50 at a data reading step 76, asynchronously with the packet reception and data writing steps described above. For this purpose, client 46 may check the current value of CI 54 and reads the data contained in the buffer that it indicates. After reading and processing the data, client 46 advances the value of CI 54 in order to signal to NIC that the buffer indicated by this CI value can be released and overwritten. At this point, if the circular receive queue is used by only a single QP, circuitry 44 advances CI 54, at a CI incrementation step 82.

If the circular receive queue and the corresponding set of buffers 50 is shared among multiple QPs, however, step 82 may be more complex. For example, one of these QPs (say QPx) in circuitry 44 may receive a send packet and start writing data to a given buffer, and another QP (say QPy) may receive a send packet and may start and finish writing to the next buffer before QPx has finished writing to the given (preceding) buffer. Client 46 may then read and finish processing the data in the buffer that was written to by QPy. To avoid possible overwriting of the buffer that is still in use by QPx, when client 46 finishes reading the data written by QPy, the client checks the status of the preceding buffers before incrementing CI 54 at step 82. If all preceding buffers have been released, client 46 will proceed to advance CI 54 at step 82. Otherwise, client 46 waits for the preceding buffers to be released, and only then advances CI 54.

Occasionally, an error may occur in one of the QPs in the group sharing a circular receive queue, with the result that the QP in question does not finish writing to buffer that it has begun to use. Such a situation could cause client 46 to stall at step 82, and the resulting failure to increment CI 54 may then cause circuitry 44 to stall at step 70, leading to a transient interruption of service on the other QPs in the group. To avoid this sort of situation, circuitry 44 or client 46 may actuate a timer at step 82. If a predefined timeout period then expires before all preceding buffers have been released, client 46 may query circuitry 44 to identify the stalled QP to which the unreleased buffer is currently assigned. Upon receiving a response to this query, client 46 may release the stalled QP (typically by resetting or deleting the QP) and thus free the buffer in question. Client 46 can then proceed to advance CI 54, and normal operation resumes.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for communication, comprising:
   allocating in a memory of a host device a contiguous, cyclical set of buffers for use by a transport service instance on a network interface controller (NIC) that couples the host device to a network;
   providing first and second indices to point respectively to a first buffer in the set to which the NIC is to write and a second buffer in the set from which a client process running on the host device is to read;
   receiving at the NIC from the network a message directed to the transport service instance and containing data to be pushed to the memory;
   responsively to receiving the message, writing the data contained in the received message, to the first buffer that is pointed to by the first index and advancing the first index cyclically through the set; and
   advancing the second index cyclically through the set when the data in the second buffer have been read by the client process,
   wherein receiving the message comprises processing the message in the NIC without consuming a work queue element (WQE) from a receive queue of the transport service instance, and
   wherein the host device does not post WQEs and does not allocate memory space for the WQEs for the transport service instance.

2. The method according to claim 1, wherein the buffers are all of a uniform size.

3. The method according to claim 2, wherein the uniform size is one byte.

4. The method according to claim 2, wherein writing the data comprises writing the data from a single message to a succession of the buffers responsively to a quantity of the data in the message, and wherein advancing the first index comprises advancing the first index by multiple increments, corresponding to the succession of the buffers.

5. The method according to claim 1, wherein advancing the first index comprises comparing the first and second indices, and refraining from accepting further data directed to the transport service instance when the first and second indices coincide.

6. The method according to claim 1, wherein allocating the cyclical set of buffers comprises sharing the buffers in the set among a group of multiple transport service instances, such that different transport service instances in the group use different ones of the buffers in succession.

7. The method according to claim 6, wherein advancing the second index comprises verifying that the buffers prior to the second buffer have been read and released by the different transport service instances before advancing the second index.

8. The method according to claim 7, and comprising, upon finding that one of the buffers has not been released over a predefined timeout period, identifying a stalled transport service instance to which the one of the buffers is assigned, and releasing the stalled transport service instance.

9. The method according to claim 1, wherein allocating the set of the buffers comprises allocating a contiguous range of virtual memory addresses.

10. The method according to claim 1, wherein allocating the set of the buffers comprises allocating a contiguous range of physical memory addresses.

11. A network interface controller (NIC), comprising:
a network interface, which is configured to be coupled to a network;
a host interface, which is configured to be coupled to a host device having a memory, in which a contiguous, cyclical set of buffers is allocated for use by a transport service instance on the NIC; and
processing circuitry, which is coupled between the network interface and the host interface and is configured to handle first and second indices, which point respectively to a first buffer in the set to which the NIC is to write and a second buffer in the set from which a client process running on the host device is to read, such that responsively to receiving a message from the network that is directed to the transport service instance and contains data to be pushed to the memory, the processing circuitry writes the data contained in the received message, to the first buffer that is pointed to by the first index and advances the first index cyclically through the set, and the second index is advanced cyclically through the set when the data in the second buffer have been read by the client process,
wherein the processing circuitry is configured to process the message without consuming a work queue element (WQE) from a receive queue of the transport service instance, and
wherein the processing circuitry is configured so that the host device does not post WQEs and does not allocate memory space for the WQEs for the transport service instance.

12. The controller according to claim 11, wherein the buffers are all of a uniform size.

13. The controller according to claim 12, wherein the uniform size is one byte.

14. The controller according to claim 12, wherein the processing circuitry is configured to write the data from a single message to a succession of the buffers responsively to a quantity of the data in the message, and to advance the first index by multiple increments, corresponding to the succession of the buffers.

15. The controller according to claim 11, wherein the processing circuitry is configured to compare the first and second indices, and to refrain from accepting further data directed to the transport service instance when the first and second indices coincide.

16. The controller according to claim 11, wherein the buffers in the set are shared among a group of multiple transport service instances, such that different transport service instances in the group use different ones of the buffers in succession.

17. The controller according to claim 16, wherein the processing circuitry is configured to confirm that the buffers prior to the second buffer have been read and released by the different transport service instances before advancing the second index.

18. The controller according to claim 17, wherein the processing circuitry is configured, upon finding that one of the buffers has not been released over a predefined timeout period, to identify a stalled transport service instance to which the one of the buffers is assigned, so as to cause the stalled transport service instance to be released.

19. The controller according to claim 11, wherein the set of the buffers occupies a contiguous range of virtual memory addresses.

20. The controller according to claim 11, wherein the set of the buffers occupies a contiguous range of physical memory addresses.

* * * * *